Nov. 23, 1926.
O. P. SMITH
1,607,650
HURDLE FOR RACE COURSES AND THE LIKE
Filed June 24, 1924
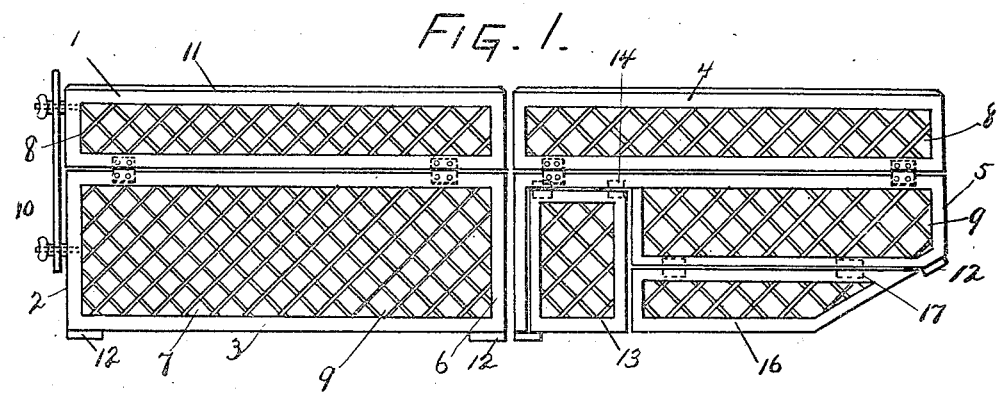
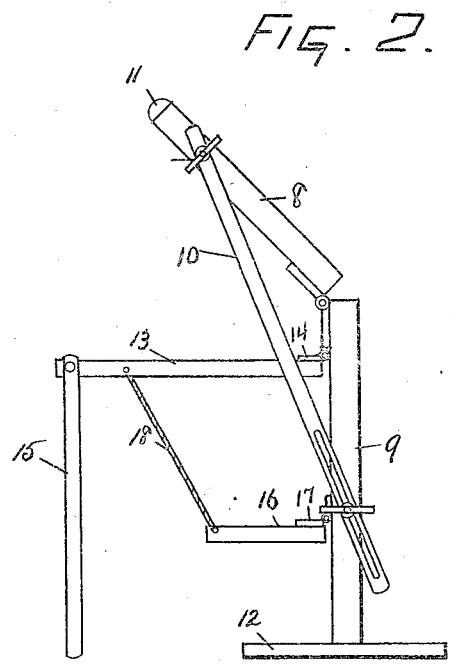
Owen P. Smith
By Chester W. Brown
his Attorney Patented Nov. 23, 1926.

1,607,650

UNITED STATES PATENT OFFICE.

OWEN P. SMITH, OF CHICAGO, ILLINOIS.

HURDLE FOR RACE COURSES AND THE LIKE.

Application filed June 24, 1924. Serial No. 722,022.

My invention relates to hurdles, or obstructions to be placed along a race track or the like when it is desired to require the persons or animals racing to jump the hurdles and thus retard their speed, and also to test them in running with such hurdles to be jumped in the course of their race.

One object of my present invention is to provide such a hurdle that is movable, and adapted to be placed upon the track and removed therefrom quickly and conveniently.

Another object is to provide such a hurdle that will entirely cross and close the track when used for dogs or other animals, and thus prevent such animals from running through or around such hurdle in the course of the race.

Another object of the present invention is to provide such a hurdle with a gate or door suitable to permit the mechanical rabbit and conveyor arm described by me in my Patent No. 1,379,224 to pass therethrough, and means for closing said door or gate before the dogs or other animals reach said hurdle.

With the foregoing, and other objects in view, which will more fully appear from the following description, I have illustrated in the accompanying drawings, one style of my said hurdle, especially adapted for use with racing dogs and my said mechanical rabbit. And while this is my preferred style of construction, I do not wish to be confined to this exact style or shape. In the accompanying drawings, in which like reference characters designate the same objects or parts throughout, Figure 1 represents a side elevation of my said hurdle, with the doors or gates closed.

Figure 2 is an end view, showing the doors or gates open for passage of the mechanical rabbit and supporting arm.

In the accompanying drawings, I have preferably shown a style of hurdle adapted for use with my mechanical rabbit and supporting arm shown in my Patent No. 1,379,-224. The hurdle as usually employed by me is constructed of a frame work of wood, 1, 2, 3, 4, 5, 6 connected together at the corners, with a suitable lattice or wire netting or the like as 7 to close the openings between the frame pieces. I have preferably made the hurdles with an upper section 8, attached to the lower section by means of hinges, and adapted to be raised or lowered, as desired, to adjust the height to that preferred for the dogs or animals racing. An arm 10 is provided, with a slot, bolt and thumb nut to hold the said upper section rigidly at the position desired. On the top of said hurdle I have provided a padding 11, of some soft material, covered with cloth or leather or other suitable material, to prevent any injury to the dogs or other animals in case they should strike the top of said hurdle in jumping the same.

The lower section of said hurdle, indicated by numeral 9, I have provided with the extension 12 shown at the bottom, to form feet for holding said hurdle more firmly in an upright position and against being pushed or tumbled over in use. At 13 I have provided a door or gate to permit my mechanical rabbit, as mentioned above, to pass through said hurdle in the course of its passage about the race track. This door is preferably hinged to the lower section 9 by spring actuated hinges 14, 14 of any usual kind, and is also provided with the prop 15, pivotally attached at one end to said door, and shown in Figure 2 with its lower end resting upon the ground to hold the door open when desired. I have also provided a second door or gate, 16, to permit the supporting arm of my mechanical rabbit, mentioned above, to pass through said hurdle. Said door or gate 16 is attached to the lower section 9, preferably by means of spring actuated hinges 17, 17. A rope, chain, or other suitable material 18, connects the two doors or gates 13, and 16 together, passing through the lattice, and is so attached, and adjusted as to length, that when the door 13 is opened to position shown in Figure 2, the said door 16, will also be opened and held in open position as shown in Figure 2, and whenever the prop 15 is removed from beneath the door 13, and the door 13 is closed by the force of gravity and the spring actuated hinges, the said door 16, will also be released, and will likewise close by force of gravity and the said spring actuated hinges described.

When it is desired to install my said hurdle upon a race track, it is placed across the track at the point desired, and the upper section 8 is adjusted to the angle and height desired. The trap door 13 is then opened, and the prop 15 placed to rest upon the ground and support it. This also, as above described, opens and holds open the second door 16. When the mechanical rabbit above mentioned passes through the said door in the said hurdle, the supporting arm hits the prop 15 and releases the door 13, so that it closes, and the door 16 also closes, as above described, entirely closing the hurdle as shown in Figure 1. The dogs or other animals are thus prevented from passing through said doors, and are compelled to jump over said hurdle, which is the aim in its construction and placement upon said track.

While I have shown only one hurdle, several may be employed at different points along the course of the track. I have also preferably made my hurdles in two sections, but it will be apparent that they may be made in one section, or in more than two sections, if desired, without departing from the spirit of the invention.

I have also preferably made my hurdles with an upper section hinged to the lower, and adapted to be adjusted as to height and angle with respect to the lower section. It will be apparent that said hurdle may be made solid, if desired, or may be made in more than two adjustable sections, if preferred without departing from the spirit of the invention. While I have shown my hurdle with the two doors 13, and 16, it will be apparent that said hurdles may be provided with only one door of the shape and size required, or when not needed the said doors may be omitted entirely, without in any manner departing from the spirit of the invention.

Having thus described my said invention, what I claim, and desire to secure by Letters Patent, is the following:—

1. In a device of the class described, the combination of a lower frame, an upper frame hinged thereto at the top, a door in said lower frame attached thereto by hinges located at the top of the door, and means for holding said door open consisting of a prop pivoted to the door and arranged to be tripped by an object passing through the said door to close the same.

2. In a device of the class described, the combination of a hurdle covered with lattice, a door therein hinged thereto, a second door therein also hinged thereto, a pivoted prop connected with one door for holding the same open and arranged to be tripped by an object passing through such door, and means for connecting the doors with each other to enable the same to be held open simultaneously by the prop and to be closed simultaneously by the tripping of the prop.

In testimony whereof, I have hereunto subscribed my name.

OWEN P. SMITH.